(12) United States Patent
Tidrow et al.

(10) Patent No.: US 11,567,909 B2
(45) Date of Patent: Jan. 31, 2023

(54) MONITORING DATABASE MANAGEMENT SYSTEMS CONNECTED BY A COMPUTER NETWORK

(71) Applicant: salesforce.com, inc., San Francisco, CA (US)

(72) Inventors: Patrick Allen Tidrow, Greenwood, IN (US); Matthew William Jones, Carmel, IN (US)

(73) Assignee: Salesforce, Inc., San Francisco, CA (US)

( * ) Notice: Subject to any disclaimer, the term of this patent is extended or adjusted under 35 U.S.C. 154(b) by 218 days.

(21) Appl. No.: 16/922,708

(22) Filed: Jul. 7, 2020

(65) Prior Publication Data

US 2022/0012216 A1    Jan. 13, 2022

(51) Int. Cl.
```
G06F 7/00      (2006.01)
G06F 17/00     (2019.01)
G06F 16/21     (2019.01)
G06F 16/23     (2019.01)
G06F 8/61      (2018.01)
G06F 11/34     (2006.01)
G06F 11/30     (2006.01)
```
(52) U.S. Cl.
CPC ............. G06F 16/21 (2019.01); G06F 8/61 (2013.01); G06F 11/302 (2013.01); G06F 11/3055 (2013.01); G06F 11/3495 (2013.01); G06F 16/2379 (2019.01)

(58) Field of Classification Search
None
See application file for complete search history.

(56) References Cited

U.S. PATENT DOCUMENTS

| | | | | |
|---|---|---|---|---|
| 2012/0096046 | A1* | 4/2012 | Kucera | H04L 67/306 707/802 |
| 2012/0102402 | A1* | 4/2012 | Kwong | G06F 9/453 715/705 |
| 2016/0020965 | A1* | 1/2016 | Sakata | G06F 11/2033 709/224 |

OTHER PUBLICATIONS

Gerend, J. et al., "Failover Clustering in Windows Server," Jun. 6, 2019, two pages, [Online] [Retrieved on Jul. 24, 2020] Retrieved from the Internet <URL: https://docs.microsoft.com/en-us/windows-server/failover-clustering/failover-clustering-overview>.

Idera, Inc., "SQL Server Inventory Management—SQL Inventory Manager," Date Unknown, three pages, [Online] [Retrieved on Jul. 24, 2020] Retrieved from the Internet <URL: https://www.idera.com/productssolutions/sqlserver/sql-elements>.

(Continued)

*Primary Examiner* — Tuan A Pham
(74) *Attorney, Agent, or Firm* — Fenwick & West LLP (57) ABSTRACT

A database management system (DBMS) tracking system tracks location and status of DBMSs running on servers, for example, servers of an organization connected by a network. The DBMS tracking system periodically receives information describing servers from a directory service. The DBMS tracking system maintains a DBMS tracking table. The DBMS tracking system installs database agents on DBMSs. The database agents send tracking messages and status messages to the DBMS tracking system. The DBMS tracking system updates the information stored in the DBMS tracking table based on the tracking messages and status messages.

20 Claims, 5 Drawing Sheets

(56) References Cited

OTHER PUBLICATIONS

Red Gate Software Ltd, "SQL Monitor," Date Unknown, 12 pages, [Online] [Retrieved on Jul. 24, 2020] Retrieved from the Internet <URL: https://www.red-gate.com/products/dba/sql-monitor/>.
Solarwinds Worldwide, LLC, "IT Inventory Management and Asset Tracking for Hardware and Software," Date Unknown, seven pages, [Online] [Retrieved on Jul. 24, 2020] Retrieved from the Internet <URL: https://www.solarwinds.com/server-application-monitor/use-cases/it-inventory-management?CMP=KNC-TAD-GGL-SW_NA_X_PP_CPC_LD_EN_PRODP_TIN-SAM-957920830~91416492676_g_c_server%20inventory-p~413599458700p~~~51140245130&ds_cid=71700000047470899&ds_agid=58700005605928053&networn=g&device=c&keyword=Server%20inventory&matchtype=p&creative=413599458700&feeditemid=&gclid=EEAIaIQobChMI-nJ16XK6AIVgpOzCh1CLg-yEAAYASAAEgLv1_D_BwE&gclsrc=aw.ds>.

* cited by examiner

| CLUSTER NAME | HARDWARE | | | |
|---|---|---|---|---|
| | SERVER S1<br>768 GB, 44 Cores | SERVER S2<br>768 GB, 44 Cores | SERVER S3<br>768 GB, 44 Cores | SERVER S4<br>768 GB, 44 Cores |
| Cluster C1 | [02/28/2020 22:45] | [05/01/2020 02:28]<br>ACTIVE | [03/25/2020 02:46] | [01/03/2020 02:21] |
| Cluster C2 | [03/31/2020 18:23] | [03/04/2020 23:34] | [02/28/2020 17:28] | [04/29/2020 16:20]<br>ACTIVE |
| Cluster C3 | [04/30/2020 02:57]<br>ACTIVE | [02/28/2020 17:28] | [01/23/2020 16:18] | [03/19/2020 14:10] |
| Cluster C4 | [01/10/2020 03:04] | [05/01/2020 02:30] | [05/01/2020 02:30]<br>ACTIVE | [01/19/2020 91:20] |
| Cluster C5 | [04/01/2020 03:09] | [03/05/2020 03:05] | [02/28/2020 17:28] | [04/30/2020 02:57]<br>ACTIVE |

MONITORING DATABASE MANAGEMENT SYSTEMS CONNECTED BY A COMPUTER NETWORK

BACKGROUND

Field of Art

This disclosure relates in general to management and tracking of computing resources connected via a network, and in particular to tracking database management systems (DBMSs) connected via a computer network.

Description of the Related Art

Large organizations use multiple instances of database management systems for managing data for the organization. For example, systems such as multi-tenant systems may serve several organizations and therefore use thousands of computers and run a large number of DBMSs. Several applications of the organization may access these database management systems. These organizations monitor these DBMSs to track how many instances are running, the type of hardware on which these instances are running, the performance of each instance and so on.

Conventional techniques for tracking DBMSs require manual data entry, for example, a user identifying servers running DBMSs and manually entering the data into a system. Manual tracking of such DBMSs can be a slow and error prone process. For example, tracking a large network can take days or weeks. Furthermore, DBMSs may be relocated from one server to another for load balancing and failover purposes. Therefore, information tracked using a slow manual process may get outdated by the time the process is completed since some of the DBMSs may have moved. Therefore, conventional techniques for tracking DBMSs are slow and error prone.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Organizations need to track DBMSs running on servers of the organization. Typically, organizations need to track how many DBMSs are running on each server, whether the DBMS has good performance, did a DBMS stop running for any reason, and so on. A DBMS may be configured to move from one server to another, for example, for failover reasons or for load balancing. Therefore, a server that is expected to run on a particular server may get moved to a different server. Techniques that require users to register each DBMS in a system require manual data entry and are therefore are slow an error prone.

Embodiments of the invention comprise a DBMS tracking system that tracks the location and status of DBMSs running on servers, for example, servers of an organization connected by a network. The DBMS tracking system periodically receives information describing servers from a directory service, for example, once a week. The DBMS tracking system maintains a DBMS tracking table based on the information received from the directory service. The DBMS tracking table identifies candidate servers expected to run a DBMS and if there is a DBMS currently running on the server, the DBMS tracking table also stores information describing the status of the DBMS running on the server.

For each server identified in the DBMS tracking table, the DBMS tracking system determines whether a DBMS is currently running on the server. If the DBMS tracking system determines that a DBMS is currently running on the server, the DBMS tracking system sends instructions for installing an agent on the to the DBMSs. The agent is configured to send a tracking message to the DBMS tracking system at startup time of the DBMS. The tracking message identifies the server on which the DBMS is running. In some embodiments, the agent also sends a status message periodically, for example, every few minutes.

The DBMS tracking system receives tracking messages from agents installed on DBMSs. Each tracking message identifies the server on which the DBMS is currently running. The DBMS tracking system updates the DBMS tracking table based on the information received from tracking messages. In embodiments in which the agent sends a status message periodically, the DBMS tracking system stores a timestamp associated with the last status message received. The status messages allow the DBMS tracking system to determine an indication of health of the DBMS. For example, if the status message takes more than a threshold time since the previous status message, the DBMS tracking system may determine that the DBMS sending the status message has performance problems and has slow performance. Similarly, if the status message takes more than a longer threshold time, the DBMS tracking system may determine that the DBMS has stopped running, i.e., failed or crashed.

The DBMS tracking system may take some action based on the data stored in the DBMS tracking table, for example, send the information stored in the DBMS tracking table for display via a user interface of an application on a client device. Alternatively, the DBMS tracking system may send an alert message to a system administrator, if the DBMS tracking system determines that a DBMS has stopped running or has poor performance. Alternatively, the DBMS tracking system may also take an action to fix a problem that was detected by running a script. For example, if the DBMS tracking system determines that more than a threshold number of DBMSs are running on a server, the DBMS tracking system may sends instructions to relocate one or more DBMS from that server to another server.

System Environment

Figure 1:
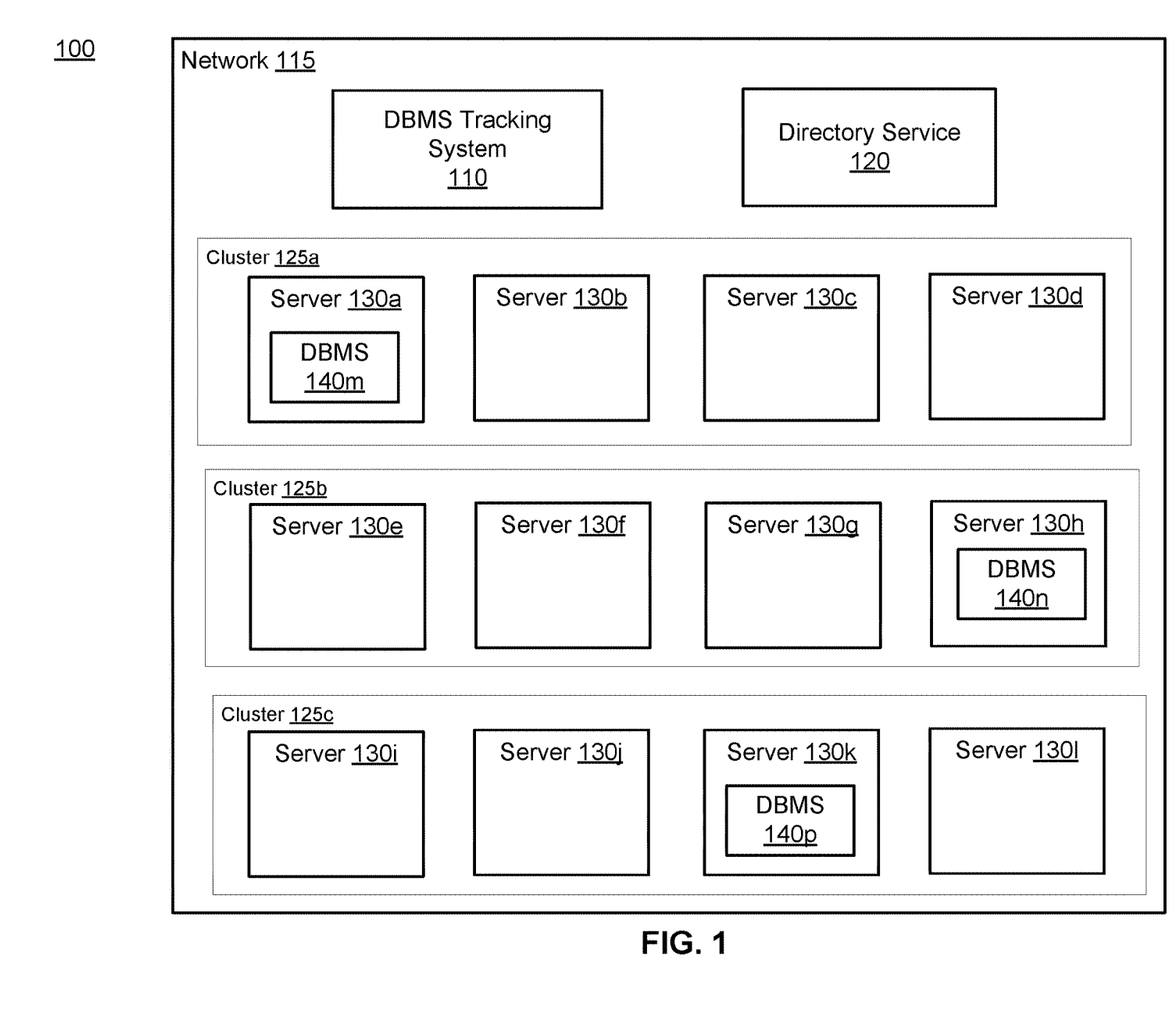
FIG. 1 is a block diagram of a system environment for monitoring database managements systems running on a set of servers, according to one embodiment.

FIG. 1 is a block diagram of a system environment for monitoring database managements systems running on a set of servers, according to one embodiment. The system environment 100 shows several computers of an organization that may interact using a network of the organization. The system environment shows a network 115 of the organization that connects a DBMS tracking system, a directory service 120, and multiple servers 130. The system environment 100 may include other systems or components not shown in FIG. 1, for example, various types of data stores, client devices for interacting with servers, and so on.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

The directory service 120 tracks information for the organization, for example, users, computing systems, and some of the software installed on the computing systems. An example of a directory service is Active Directory developed by MICROSOFT. The directory service 120 may authenticate and authorize various users and computing systems connected by the network 115. The directory service 120 may include a database for storing metadata describing the users and computing systems and executable code for servicing requests and maintaining the database. The directory service 120 processes requests to authenticate users and supports application programming interfaces (APIs) to access the metadata stored in the database of the directory service 120. The information stored in the directory service 120 is updated by system administrators on a regular basis. The information stored in the directory service 120 for a particular system is used by other systems to interact with that particular system. The directory service acts as a reliable source of the computing systems of the organization that are connected by the network 115. The active directory may be maintained by system administrators of the organization. The directory service 120 identifies all database management systems accessible by various systems connected by the network 115. The directory service 120 provides a name for each server. The DBMS tracking system 110 uses the server name to identify the various services running on that server. The DBMS tracking system 110 checks if the services include a DBMS running on that server. If the DBMS tracking system 110 determines that a DBMS is running on that server, the DBMS tracking system 110 connects to the DBMS running on that server, for example, to install a database agent on the DBMS.

The DBMS tracking system 110 receives a list of servers from the directory service 120 and filters the list to determine a set of servers that are likely to run a DBMS. The DBMS tracking system 110 installs a database agent on these DBMSs for tracking the DBMSs. The database agents send messages to the DBMS tracking system 110 that allow the DBMS tracking system 110 to maintain a DBMS tracking table that acts as an inventory of all DBMSs running on servers of the network 115.

The servers 130 may be organized as clusters 125. As shown in FIG. 1, each cluster includes multiple servers 130, for example, four servers 130 per cluster 125. For example, cluster 125a has servers 130a, 130b, 130c, and 130d, cluster 125b has servers 130e, 130f, 130g, and 130h, and cluster 125c has servers 130i, 130j, 130k, and 130l. In an embodiment, a DMBS is assigned to a cluster. The DBMS may run on any one of the servers of the cluster 125. For example, the DBMS 140m runs on server 130a of cluster 125a, the DBMS 140n runs on server 130h of cluster 125b, the DBMS 140p runs on server 130k of cluster 125c, and so on. In some embodiments, a server may be a powerful machine with a large number of cores and may be included in multiple clusters. Accordingly, multiple DBMSs may run on the same server.

A DBMS may be relocated from one server of the cluster to another server. For example, if the DBMS 140m running on server 130a encounters some issues, the DBMS may be moved from server 130a to server 130b. A DBMS is moved from server S1 to another server S2 by shutting down the DBMS on the server S1 and starting the DBMS on server S2. Accordingly, every relocation of a server causes the DBMS to start up on the new server, thereby causing the DBMS to execute any processes or agents that are configured to execute upon startup of the DBMS.

The DBMS may be relocated for failover or switchover reasons. For example, the DBMS may be switched from a primary server to a secondary server. During the time that the DBMS switches from one server top another, there is a small outage of the DBMS for less than a threshold time interval. The DBMS may be switched from a primary server to another server if a disaster occurred that caused the primary server to become unavailable. For example, the primary server may have crashed or have network failure making the primary server unavailable to users.

In an embodiment, one or more processes monitor the servers to determine whether the DBMS should be moved to another server. These processes may move DBMSs for performing load balancing across servers or for performing proper resource allocation across the network. These processes may use a DBMS tracking table maintained by the DBMS tracking system 110 to determine whether to move a DBMS. For example, a process may move a DBMS from a source server to a target server if there are more than a threshold DBMSs determined to be running on the source server. Alternatively, a process may move a DBMS from a server to another server if there are less than a threshold DBMSs determined to be running on the target server The relocation of DBMSs across servers may cause too many or too few DBMSs running on a server. The DBMS tracking system 110 tracks the DBMSs to determine whether a particular server has more than a threshold DMBSs running or less than a threshold DBMSs running at a given time. The DBMS tracking system 110 tracks the DBMSs on a continuous basis to determine whether a server has too many or too few DBMSs. The DBMS tracking system 110 executes the processes described herein according to various embodiments to track the DBMSs in real time, i.e., within a short time interval of any event occurring that impacts the information being collected.

In some embodiment, the servers 130 implement a multi-tenant system. A multi-tenant system stores data of one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants.

In one embodiment, a multi-tenant system implements a web-based customer relationship management (CRM) system. For example, the multi-tenant system may store applications configured to implement and execute CRM software applications. As an example, one tenant might be a company that employs salespersons that use client devices to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

Since a multi-tenant system may store information for several enterprises or organizations, the multi-tenant system needs a large number of servers running a large number of DBMSs. Each DBMS may be shared across multiple tenants. Accordingly, a multi-tenant system needs to implement policies to relocate DBMSs in case of failover to ensure that the DBMSs have very small downtime.

The servers 130 shown in FIG. 1 represent computing systems. A computing system can be a conventional computer system executing, for example, a Microsoft™ Windows™-compatible operating system (OS), Apple™ OS X, and/or a Linux OS. A computing system such as a client device can be a laptop, desktop, or any device with a display monitor for displaying a user interface.

In various embodiments, the network 115 uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
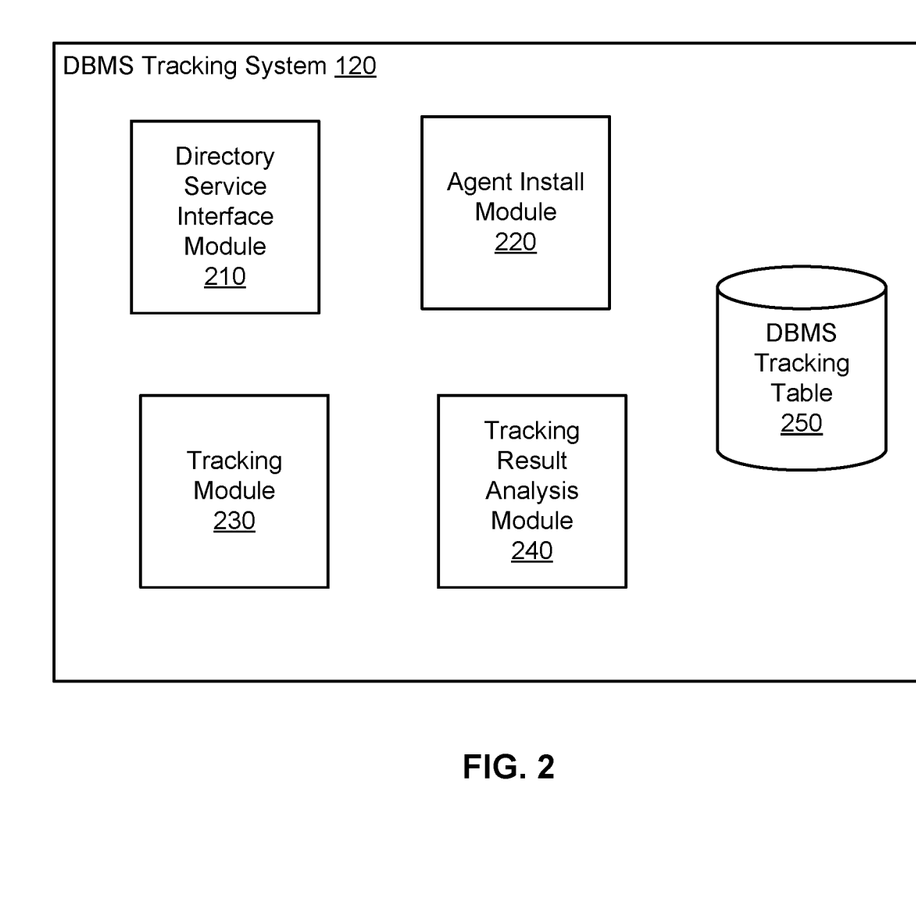
FIG. 2 is a block diagram illustrating architecture of a DBMS tracking system, according to one embodiment.

FIG. 2 is a block diagram illustrating architecture of a DBMS tracking system, according to one embodiment. The DBMS tracking system includes a directory service interface module 210, an agent install module 220, a tracking module 230, a tracking result analysis module 240, and a DBMS tracking table 250. Other embodiments can have different and/or other components than the ones described here. Furthermore, the functionalities described herein can be distributed among the components in a different manner.

The directory service interface module 210 interfaces with a directory service 120 to obtain a list of servers that are expected to run a DBMS. In an embodiment, the directory service interface module 210 receives filtering criteria to identify a set of servers that are likely to run a DBMS. The filtering criteria may be provided by a user, for example, a system administrator. In an embodiment, the filtering criteria is specified as one or more expressions, for example, regular expressions. Each expression is based on information identifying servers, for example, based on names of servers. In an embodiment, the directory service interface module 210 determines the expressions based on historical data describing the servers on which DBMSs have run in the past.

The agent install module 220 installs a database agent on DBMSs. Once the DBMS tracking system 120 determines that a server is running a DBMS, the agent install module 220 installs a database agent on the DBMS. The agent install module 220 may interact with the DBMS to check if the DBMS already has the agent installed. If the DBMS has a database agent previously installed, the agent install module 220 does not need to take further action. If the DBMS does not have a database agent previously installed, the agent install module 220 sends instructions for installing the agent on the DBMS. The instructions may provide the executable code for the database agent or provide a location from where the DBMS can download the executable code and install the database agent. A database agent may also be referred to herein as an SQL agent.

The database agent is configured to send a tracking message to the DBMS tracking system 120 at startup time of the DBMS. The tracking message provides location of the DBMS by identifying the server on which the DBMS is running. In an embodiment, the database agent is also configured to send a status message periodically to the DBMS tracking system 120, for example, every few minutes. The status message is also referred to as a heartbeat message since it indicates to the DBMS tracking system 120 that the DBMS is alive, i.e., currently running.

The tracking module 230 receives tracking messages and status messages from agents installed on DBMSs. The tracking module 230 stores the information received from the DBMSs as tracking messages and status messages. The tracking module 230 updates the DBMS tracking table 250 based on the messages received.

The tracking result analysis module 240 analyzes the results of tracking DBMSs and takes actions based on them. In an embodiment, the tracking result analysis module 240 generates reports describing DBMSs running on servers of a network and provides them for display, for example, to a system administrator of an organization. The tracking result analysis module 240 may generate alerts based on the analysis of information stored in the DBMS tracking table 250. For example, if the tracking result analysis module 240 determines that the time intervals between status messages received from a DBMS are longer than a threshold value, the tracking result analysis module 240 may send an alert indicating a possible performance issue with the DBMS. Similarly, of the tracking result analysis module 240 determines that no status message has been received from a DBMS for more than a ling threshold time, the tracking result analysis module 240 may send an alert indicating that the DBMS may have failed.

The DBMS tracking table 250 stores a table that describes the results of tracking of DBMSs. In an embodiment, the DBMS tracking table 250 identifies servers on which DBMSs are currently running. The DBMS tracking system 120 updates the DBMS tracking table 250 on a regular basis. In an embodiment, DBMS tracking system 120 receives status messages from agents installed on each DBMS and stores a timestamp associated with the last status message received for a DBMS in the DBMS tracking table 250. For example, the timestamp may represent the time at which the last status message for a DBMS was received by the DBMS tracking system 120. Alternatively, the timestamp may represent the time at which the last status message for a DBMS was sent.

Overall Process

Figure 3:
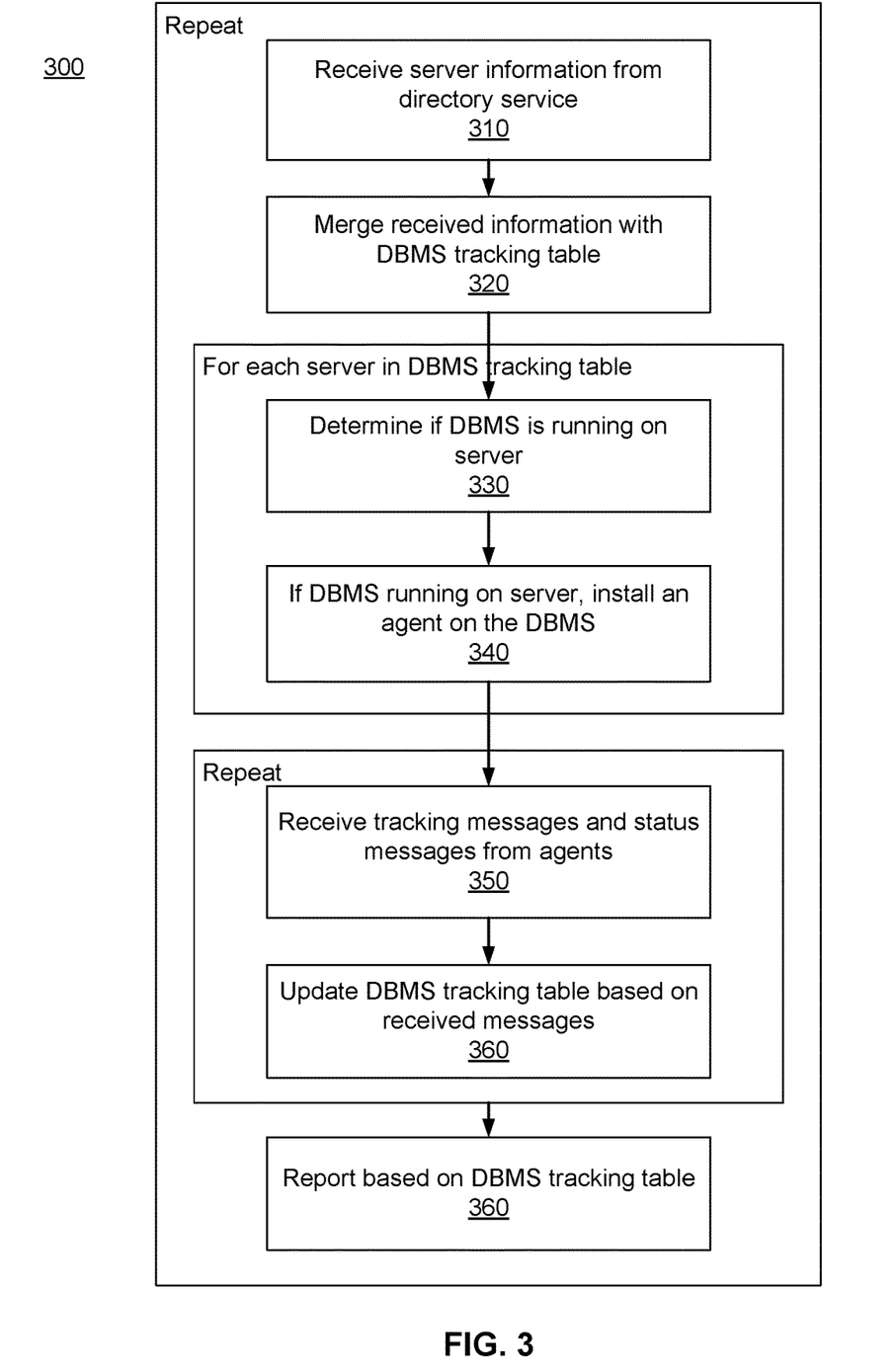
FIG. 3 is a flow chart illustrating the overall process for monitoring database managements systems running on a set of servers, according to an embodiment.

FIG. 3 is a flow chart illustrating the overall process for monitoring database managements systems running on a set of servers, according to an embodiment. Other embodiments can perform the steps of these flowcharts in different orders. Other embodiments can include different and/or additional steps than the ones described herein.

The DBMS tracking system 120 maintains a DBMS tracking table 250 based on information obtained from various sources. The DBMS tracking table 250 stores information describing the mapping of DBMSs to servers. Accordingly, the DBMS tracking table 250 stores the identity of the server on which each DBMS of the network 115 is running. In some embodiments, the DBMS tracking table 250 further stores information indicating a health of each DBMS, for example, a timestamp associated with a status message received from the DBMS.

The DBMS tracking system 120 initializes the DBMS tracking table 250 using information obtained from a directory service 120. The DBMS tracking system 120 receives 310 information describing servers on the network 115 from the directory service 120 periodically, for example, once every week or every few days and merges 320 the received information with the DBMS tracking table 250.

The DBMS tracking system 120 merges the received information by checking if the information is already present in the DBMS tracking table 250. If the information is already present in the DBMS tracking table 250, the DBMS tracking system 120 does not take any action. If the information is missing in the DBMS tracking table 250, the DBMS tracking system 120 adds the information. If the information is incorrect in the DBMS tracking table 250, the DBMS tracking system 120 updates the information by deleting the incorrect information and storing the correct information.

In an embodiment, the DBMS tracking system 120 receives a list of servers that are expected to run a DBMS from the directory service 120. The DBMS tracking system 120 may obtain a list of all servers of the network 115 that the directory service 120 is tracking. The DBMS tracking system 120 filters the list of servers based on predefined criteria. The predefined criteria may be specified using expressions representing names of servers that are expected to run DBMSs. For example, a system administrator may use a naming convention that assigns DBMSs to specific servers. The DBMS tracking system 120 receives expressions that encode the naming convention. The DBMS tracking system 120 matches the names of the servers received against the expressions to filter a subset of servers that have names that satisfy the expressions. The expressions used for filtering the servers may be modified over time. The DBMS tracking system 120 may receive the updated expressions from a user or may automatically modify the expressions based on analysis of the servers historically determined to run DBMSs.

The DBMS tracking system 120 interacts with each server from the subset of servers obtained by applying the filtering criteria. The DBMS tracking system 120 determines based on the interaction whether the server is running a DBMS. In an embodiment, the DBMS tracking system 120 remotely runs system commands that check for specific processes running on the server to determine whether a DBMS is running on the server. If certain predetermined processes are running on the server, the DBMS tracking system 120 determines that the server is running a DBMS. In an embodiment, the DBMS tracking system 120 stores a port of the server configured for connecting with the DBMS running on the server. The DBMS tracking system 120 attempts to interact with the DBMS by contacting the server at that port. If the DBMS tracking system 120 succeeds to contact the DBMS on the port of the server, the DBMS tracking system 120 determines that there is a DBMS running on the server. If there is no DBMS running on the server, the DBMS tracking system 120 receives a special code, for example, an error code when the DBMS tracking system 120 attempts to contact the port on the server. If the DBMS tracking system 120 receives the special code, the DBMS tracking system 120 determines that there is no DBMS on the server.

For each candidate server identified in the DBMS tracking table, the DBMS tracking system 120 determines 330 whether a DBMS is currently running on the server. If the DBMS tracking system 120 determines that a DBMS is currently running on the server, the DBMS tracking system 120 sends instructions to the DBMS for installing a database agent. The database agent is configured to send a tracking message to the DBMS tracking system at startup time of the DBMS. The tracking message identifies the server on which the DBMS is running, for example, by including the name of the server in the tracking message. In an embodiment, the database agent runs a process whenever the DBMS starts up. The process is configured to send the tracking message to the DBMS tracking system 120.

The DBMS tracking system 120 receives the tracking messages sent by database agents installed various DBMSs running on the servers connected by the network 115. Each tracking message received from a database agent running on a DBMS identifies the server on which the DBMS is running. The DBMS tracking system 120 updates the DBMS tracking table based on information received from tracking messages.

The DBMS tracking system 120 may take actions based on the information stored in the DBMS tracking table. For example, the DBMS tracking system 120 may send the information stored in the DBMS tracking table for display via a user interface displayed via an application running on a client device. The DBMS tracking system 120 may send specific alerts based on information obtained from the DBMS tracking table to a user, for example, a system administrator. An alert may describe a specific situation identified by the DBMS tracking system 120 using the DBMS tracking table. For example, the DBMS tracking system 120 may determine that a server is running more than a threshold number of DBMSs and send an alert identifying the server and information describing the DBMSs running on the server. In an embodiment, the DBMS tracking system 120 may send recommendation to move one or more DBMSs from the server to other servers.

In an embodiment, the DBMS tracking system 120 takes an action based on the recommendation, for example, by sending instructions to relocate a DBMS from this server to another server determined to have less than a threshold number of DBMSs running based on the DBMS tracking table. As another example, the DBMS tracking system 120 may determine based on status messages that a DBMS stopped running on a server. Accordingly, the DBMS tracking system 120 may inspect the processes running on the server to determine whether the DBMS is running or not. If the DBMS tracking system 120 determines that DBMS stopped running for any reason, the DBMS tracking system 120 may send instructions to the server to restart the DBMS if the DBMS is determined to not have relocated to another server.

As another example, the DBMS tracking system 120 may determine that a server is running less than a threshold number of DBMSs and sends an alert identifying the server and information describing the number of DBMSs running on the server. In an embodiment, the DBMS tracking system 120 may send recommendations to move one or more DBMSs from other servers to this server to balance the load on the server. For example, if the DBMS tracking system 120 determines that server S1 is under loaded and has less than a threshold number of DBMSs running, the DBMS tracking system 120 identifies a server S2 that is overloaded and has more than a threshold DBMSs running. The DBMS tracking system 120 selects one or more DBMSs running on server S2 for being relocated to server S1. In an embodiment, the DBMS tracking system 120 takes an action based on the recommendation, for example, by sending instructions to relocate a DBMS running on server S2 to server S1.

In an embodiment, the database agent for a DBMS is configured to periodically send a status message indicating that the DBMS is running. The DBMS tracking table stores information indicating a current status of each DBMS. For each database agent currently running, the DBMS tracking system 120 periodically receives status messages from the database agent indicating that the DBMS is currently running. The DBMS tracking system 120 updates the status in the DBMS tracking table for the DBMS corresponding to the database agent. The DBMS tracking system 120 uses the length of the time interval between status messages received from a DBMS as an indication of health of the DBMS. For example, if the status messages have timestamps indicating longer than a threshold time interval, the DBMS tracking system 120 may determine that the DBMS has poor performance. Similarly, of no status message has been received from a DBMS for more than a threshold time interval, the DBMS tracking system 120 may determine that the DBMS has likely stopped running.

Figure 4:
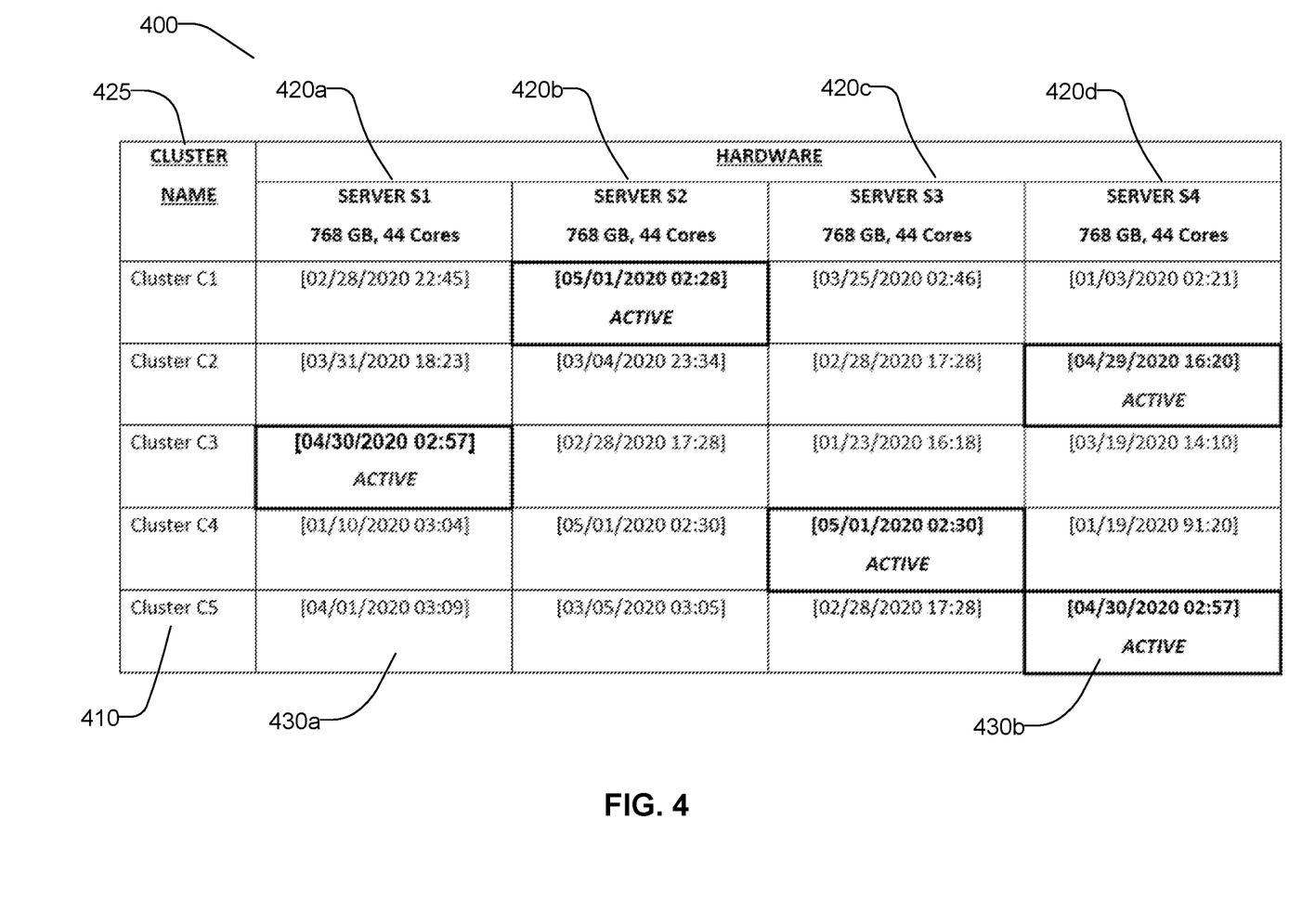
FIG. 4 shows an example of a DBMS tracking table generated by a DBMS tracking system, according to an embodiment.

FIG. 4 shows an example of a DBMS tracking table generated by a DBMS tracking system, according to an embodiment. Other embodiments may store different type of information in the DBMS tracking table.

As shown in FIG. 4, each server can be part of multiple clusters. The table 400 shows a column 425 identifying each cluster 410. The table 400 shows columns 420 for different servers. Each server can be a powerful computing system with several cores, for example, the servers S1, S2, S3, and S4 indicated in FIG. 4 have memory of 768 GB and 44 cores. The table 400 shows the timestamp associated with the last status message that we received from a DBMS associated with a cluster running on the server. Since a DBMS can move from one server to another within a cluster, the server on which the DBMS is currently running continues to send the status message periodically. Accordingly, the server on which the DBMS is running has the most recent timestamp for the cluster and is marked as active for that DBMS, for example, as indicated by cell 430. The remaining servers of the cluster are assumed to be inactive for that DBMS since this DBMS is not running on those servers. For servers that are currently not running a DBMS, the table 400 stores the timestamp indicating the time that a DBMS was moved from the server to another server for failover reasons. In an embodiment, the DBMS tracking table also stores information describing SANs (storage area networks) used by a cluster and provides a link to a database performance analyzer for each cluster.

In some embodiments, the DBMS tracking system 120 monitors the status messages received from a database agent to determine the health of the DBMS. For example, the DBMS tracking system 120 determines a rate at which the status messages are received and compares with a predetermined threshold value. If the rate at which status messages are received from a database agent is below a threshold, the DBMS tracking system 120 determines that the DBMS performance is below a threshold. Accordingly, the DBMS tracking system 120 may send a message identifying the DBMS and including information indicating the low health of the DBMS. In an embodiment, in this situation, the DBMS tracking system 120 may send a recommendation to move the DBMS to another server to improve the performance. In an embodiment, in this situation, the DBMS tracking system 120 may automatically execute a script to relocate the DBMS to another server. The DBMS tracking system 120 may identify a target server for relocating the current DBMS based on the DBMS tracking table, for example, the DBMS tracking system 120 may identify a target server that has one or more DBMSs that are sending status messages at more than a threshold rate indicating a good health. In an embodiment, the DBMS tracking system 120 may execute a diagnostic script on the server to identify any performance issues on the server.

In an embodiment, instead of using a filtered list of servers obtained from the directory service, the DBMS tracking system 120 sends instructions to all servers on the network 115 to determine which servers have DBMSs running. This can be a computation intensive and communication intensive process. However, this process ensures that the DBMS tracking system 120 obtains a comprehensive set of DBMSs and does not miss out any DBMSs due to inaccuracies in the filtering criteria used to identify the candidate servers that are expected to run DBMSs. This process may be executed rarely to avoid using up computation and communication resources. In an embodiment, the DBMS tracking system 120 analyzes the comprehensive list of DBMSs and the servers they are running on to determine the filtering criteria for subsequent use in identifying servers that are expected to run DBMSs. For example, the DBMS tracking system 120 analyzes the server names obtained using the comprehensive list of DBMSs to determine common sub strings to generate expressions that encompass all DBMSs. In an embodiment, the DBMS tracking system 120 compares the names of the servers obtained against existing filtering criteria to determine if there are discrepancies representing servers that have names that do not match the filtering criteria and reports these discrepancies.

Computer Architecture

Figure 5:
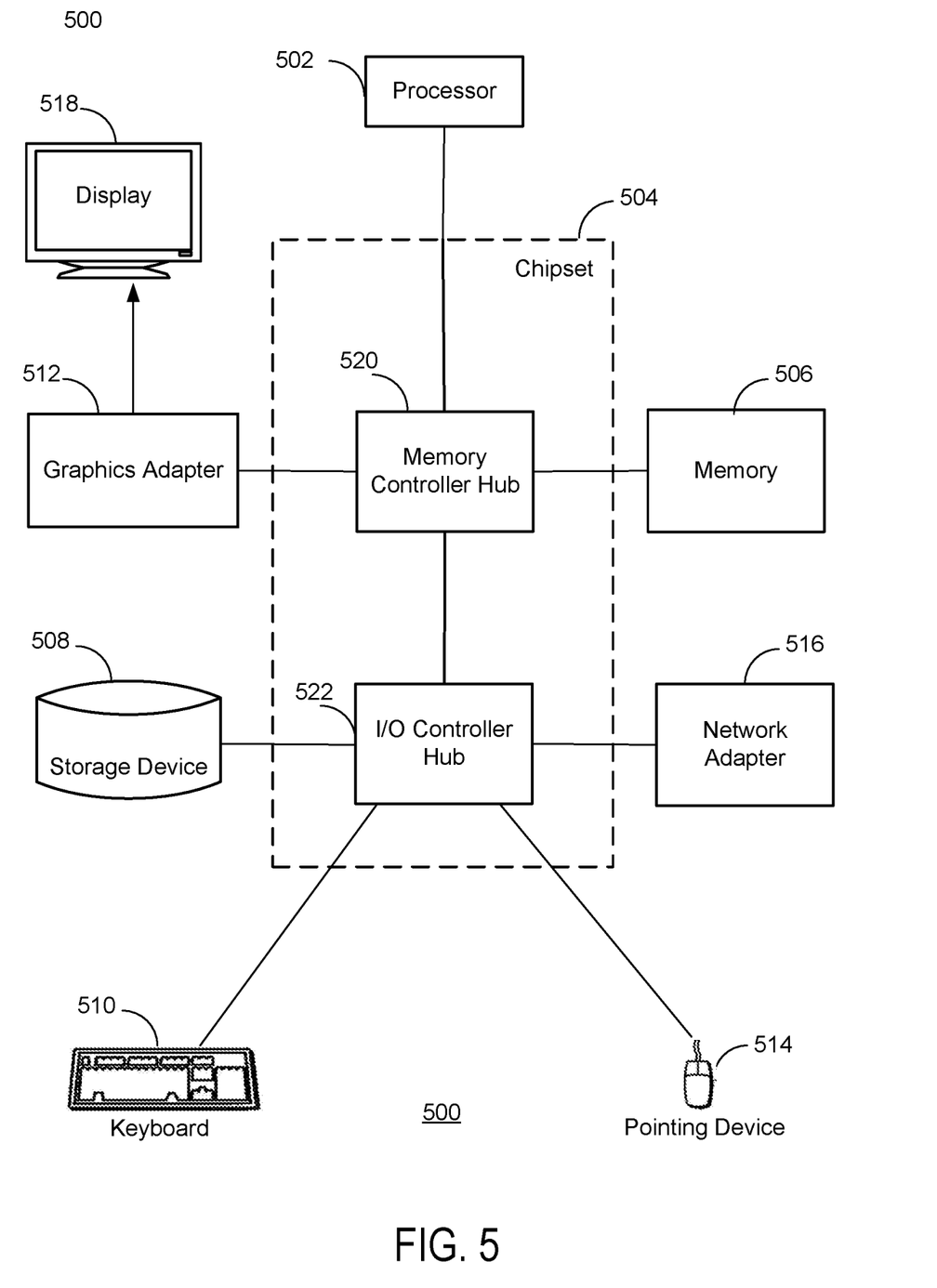
FIG. 5 is a block diagram illustrating a functional view of a typical computer system according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a network.

As is known in the art, a computer 500 can have different and/or other components than those shown in FIG. 5. In addition, the computer 500 can lack certain illustrated components. For example, a computer system 500 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 115 may be a mobile phone with limited processing power, a small display 518, and may lack a pointing device 514. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method for tracking database management systems (DBMSs) running on servers, the method comprising:
   maintaining, by a database management system (DBMS) tracking system, a DBMS tracking table based on information periodically received from a directory service, wherein the DBMS tracking table stores information describing a plurality of servers, the information describing status of a DBMS associated with each server;
   for each of the plurality of servers identified in the DBMS tracking table:
      determining whether a DBMS is currently running on the server; and
      responsive to determining that the DBMS is currently running on the server, sending to the DBMS, instructions for installing a database agent configured to send a tracking message to the DBMS tracking system at startup time of the DBMS, the tracking message identifying the server on which the DBMS is running;
   receiving, by the DBMS tracking system, a plurality of tracking messages, wherein a particular tracking message is received from a particular database agent installed on a particular DBMS, the tracking message identifying a particular server on which the particular DBMS is currently running;
   updating the DBMS tracking table to indicate that the particular DBMS associated with the particular tracking message is running on the particular server identified in the particular tracking message; and sending the information stored in the DBMS tracking table for display.

2. The computer-implemented method of claim 1, wherein the database agent for a DBMS is further configured to periodically send a status message indicating that the DBMS is currently running, and wherein the DBMS tracking table further comprises a current status of each DBMS, the computer-implemented method further comprising:

for each database agent:
periodically receiving status message from the database agent; and
updating a status in the DBMS tracking table for the DBMS corresponding to the database agent.

3. The computer-implemented method of claim 2, further comprising:

storing in the DBMS tracking table, for each server, a timestamp associated with a last status message received from a DBMS on the server.

4. The computer-implemented method of claim 3, further comprising:

responsive to failing to receive a status message from a DBMS for more than a threshold time since the last status message was received from the DBMS, sending an alert message identifying the server running the DBMS.

5. The computer-implemented method of claim 1, identifying a list of servers, each server determined to be a candidate for hosting a DBMS comprises:

receiving from a directory service, by the DBMS tracking system, information describing a set of servers.

6. The computer-implemented method of claim 5, further comprising:

receiving from a directory service, by the DBMS tracking system, information describing a plurality of servers; and determining a subset of the plurality of servers as the list of servers.

7. The computer-implemented method of claim 6, wherein determining the subset of the plurality of servers obtained from the directory service comprises:

receiving one or more expressions based on names of servers; and identifying the list of servers as servers with names that satisfy the one or more expressions.

8. The computer-implemented method of claim 7, further comprising:

determining the one of more expressions from names of a set of servers known to have hosted DBMSs in the past.

9. The computer-implemented method of claim 1, wherein a DBMS is configured to relocate from one server to another.

10. The computer-implemented method of claim 1, wherein each server belongs to a cluster of servers, wherein a DBMS running on the server is configured to relocate to any other server of the cluster of servers due to failover.

11. The computer-implemented method of claim 1, wherein the DBMSs store data for a multi-tenant system.

12. The computer-implemented method of claim 1, wherein the directory service is an active directory service.

13. The computer-implemented method of claim 1, wherein one or more DBMSs are SQL servers.

14. The computer-implemented method of claim 1, further comprising:

determining based on the DBMS tracking table, whether a server has more than a threshold load; and sending an alert message indicating that the server is overloaded.

15. The computer-implemented method of claim 1, further comprising:

performing capacity planning for a set of servers using the DBMS tracking table.

16. A non-transitory computer readable storage medium storing instructions that when executed by one or more computer processors cause the one or more computer processors to execute instructions for performing steps comprising:

maintaining, by a database management system (DBMS) tracking system, a DBMS tracking table based on information periodically received from a directory service, wherein the DBMS tracking table stores information describing a plurality of servers, the information describing status of a DBMS associated with each server;

for each of the plurality of servers identified in the DBMS tracking table:
determining whether a DBMS is currently running on the server; and
responsive to determining that the DBMS is currently running on the server, sending to the DBMS, instructions for installing a database agent configured to send a tracking message to the DBMS tracking system at startup time of the DBMS, the tracking message identifying the server on which the DBMS is running;

receiving, by the DBMS tracking system, a plurality of tracking messages, wherein a particular tracking message is received from a particular database agent installed on a particular DBMS, the particular tracking message identifying the particular server on which the particular DBMS is currently running;

updating the DBMS tracking table to indicate that the particular DBMS associated with the particular tracking message is running on the particular server identified in the particular tracking message; and sending the information stored in the DBMS tracking table for display.

17. The non-transitory computer readable storage medium of claim 16, wherein the database agent for a DBMS is further configured to periodically send a status message indicating that the DBMS is currently running, and wherein the DBMS tracking table further comprises a current status of each DBMS, wherein the stored instructions further cause the one or more computer processors to perform steps further comprising:

for each database agent:
periodically receiving status message from the database agent; and
updating a status in the DBMS tracking table for the DBMS corresponding to the database agent.

18. The non-transitory computer readable storage medium of claim 17, wherein the stored instructions further cause the one or more computer processors to perform steps further comprising:

storing in the DBMS tracking table, for each server, a timestamp associated with the last status message received from a DBMS on the server; and responsive to failing to receive a status message from a DBMS for more than a threshold time since the last status message was received from the DBMS, sending an alert message identifying the server running the DBMS.

19. The non-transitory computer readable storage medium of claim 16, wherein identifying a list of servers, each server determined to be a candidate for hosting a DBMS comprises:
receiving from a directory service, by the DBMS tracking system, information describing a plurality of servers; and
determining a subset of the plurality of servers as the list of servers by:
receiving one or more expressions based on names of servers; and
identifying the list of servers as servers with names that satisfy the expressions.

20. A computer system comprising:
one or more computer processors; and
a non-transitory computer readable storage medium storing instructions that when executed by the one or more computer processors cause the one or more computer processors to execute instructions for performing steps comprising:
maintaining, by a database management system (DBMS) tracking system, a DBMS tracking table based on the information periodically received from a directory service, wherein the DBMS tracking table stores information describing a plurality of servers, the information describing status of a DBMS associated with each server;
for each of the plurality of servers identified in the DBMS tracking table:
determining whether a DBMS is currently running on the server; and
responsive to determining that the DBMS is currently running on the server, sending to the DBMS, instructions for installing a database agent configured to send a tracking message to the DBMS tracking system at startup time of the DBMS, the tracking message identifying the server on which the DBMS is running;
receiving, by the DBMS tracking system, a plurality of tracking messages, wherein a particular tracking message from a particular database agent installed on a particular DBMS, the particular tracking message identifying a particular server on which the particular DBMS is currently running;
updating the DBMS tracking table to indicate that the particular DBMS associated with the particular tracking message is running on the particular server identified in the particular tracking message; and
sending the information stored in the DBMS tracking table for display.

\* \* \* \* \*

UNITED STATES PATENT AND TRADEMARK OFFICE
CERTIFICATE OF CORRECTION

PATENT NO. : 11,567,909 B2
APPLICATION NO. : 16/922708
DATED : January 31, 2023
INVENTOR(S) : Tidrow et al.

It is certified that error appears in the above-identified patent and that said Letters Patent is hereby corrected as shown below:

In the Specification

In Column 3, Line 62, delete "DMBS" and insert -- DBMS --, therefor.

In Column 4, Line 41, delete "DMBSs" and insert -- DBMSs --, therefor.

In the Claims

In Column 13, in Claim 8, Line 50, delete "one of more" and insert -- one or more --, therefor.

In Column 15, in Claim 20, Line 20, delete "by the one" and insert -- by one --, therefor.

In Column 15, in Claim 20, Line 26, delete "on the information" and insert -- on information --, therefor.

Signed and Sealed this
Nineteenth Day of September, 2023

Katherine Kelly Vidal
*Director of the United States Patent and Trademark Office*